(12) United States Patent
Miller

(10) Patent No.: US 10,099,853 B2
(45) Date of Patent: Oct. 16, 2018

(54) RECYCLABLE CONTAINER

(75) Inventor: Brandon Charles Miller, Oxford, GA (US)

(73) Assignee: Pratt Corrugated Holdings, Inc., Conyers, GA (US)

( * ) Notice: Subject to any disclaimer, the term of this patent is extended or adjusted under 35 U.S.C. 154(b) by 1283 days.

(21) Appl. No.: 13/163,675

(22) Filed: Jun. 18, 2011

(65) Prior Publication Data

US 2012/0318857 A1    Dec. 20, 2012

(51) Int. Cl.
| | | |
|---|---|---|
| B65D 5/42 | (2006.01) | |
| B31B 1/26 | (2006.01) | |
| B31B 1/50 | (2006.01) | |
| B65D 5/66 | (2006.01) | |
| B31B 1/14 | (2006.01) | |
| B65F 1/00 | (2006.01) | |

(52) U.S. Cl.
CPC .......... *B65F 1/00* (2013.01); *B65F 2220/102* (2013.01); *B65F 2240/156* (2013.01); *Y02W 30/64* (2015.05)

(58) Field of Classification Search
CPC . B65D 5/16; B65D 5/72; B65D 5/725; B65D 5/0254
USPC .......... 229/122, 122.1, 117.16, 162.1, 162.6, 229/141, 198.2, 124, 102; 220/676
See application file for complete search history.

(56) References Cited

U.S. PATENT DOCUMENTS

| | | | | |
|---|---|---|---|---|
| 1,194,372 A | * | 8/1916 | Fischer | 229/122.1 |
| 2,135,855 A | * | 11/1938 | Snyder | 229/113 |
| 4,566,607 A | * | 1/1986 | Smith | 229/242 |
| 4,830,270 A | * | 5/1989 | Holmes | 229/102 |
| 4,848,589 A | * | 7/1989 | Olson et al. | 229/249 |
| 4,890,789 A | * | 1/1990 | Lo Duca | 229/102 |
| 5,350,108 A | * | 9/1994 | Friar et al. | 229/102 |
| 5,507,428 A | * | 4/1996 | Robinson et al. | 229/102 |
| 5,570,808 A | * | 11/1996 | Tassoni | 221/34 |
| 5,836,478 A | * | 11/1998 | Weiss | 221/309 |
| 6,216,944 B1 | * | 4/2001 | Maglione | 229/122.1 |
| 6,644,499 B2 | * | 11/2003 | Tramontina | 221/45 |
| 6,763,970 B2 | * | 7/2004 | Harris et al. | 221/33 |
| 8,444,008 B2 | * | 5/2013 | Al-Mahnna | 221/46 |
| 2003/0213835 A1 | * | 11/2003 | Riedi | 229/122 |
| 2004/0099719 A1 | * | 5/2004 | Shadrach, III | 229/116.1 |
| 2004/0200854 A1 | * | 10/2004 | Brickwood | 221/303 |

(Continued)

OTHER PUBLICATIONS

Article entitled, "How to Make Your Own Recycling Container from Cardboard", http://www.ehow.com/how_6141434_make-own-recycling-container-cardboard.html; accessed on Feb. 9, 2011, 2 pgs.

(Continued)

*Primary Examiner* — Christopher Demeree
(74) *Attorney, Agent, or Firm* — Taylor English Duma LLP

(57) ABSTRACT

A recyclable container includes a hollow body having an outer surface and an inner surface. The hollow body includes a top end, a bottom end, and at least one side panel. The at least one side panel defines a fitted cutout, and the hollow body defines a cavity interior to the hollow body and about continuous from the top end to the bottom end. The fitted cutout defines an opening from the outer surface to the cavity. A top panel contacts the top end of the hollow body, and a bottom panel contacts the bottom end of the hollow body.

12 Claims, 12 Drawing Sheets

(56) References Cited

U.S. PATENT DOCUMENTS

2005/0199690 A1* 9/2005 Peterson .................... 229/122.1
2007/0152028 A1* 7/2007 McGowan ................. 229/122.1

OTHER PUBLICATIONS

Article entitled, "Amazing Recycled Products presents Recycled Cardboard Recycling Containers", http://www.amazingrecycled.com/cardboardcontainers.html; accessed on Feb. 9, 2011, 8 pgs.

* cited by examiner

RECYCLABLE CONTAINER

FIELD

This disclosure relates to recyclables. In particular, this disclosure relates to containers for recyclables.

BACKGROUND

To be recycled, recyclable waste typically must be collated by type. Paper goods typically cannot be combined with plastic or aluminum. Although a typical workspace provides ample opportunity to recycle, many professionals do not have the time to sort through goods. Many workspaces lack receptacles for recyclables and are, therefore, ill-equipped to promote recycling among workers.

SUMMARY

Disclosed is a container for recyclables. The recyclable container includes a hollow body having an outer surface and an inner surface. The hollow body includes a top end, a bottom end, and at least one side panel. The at least one side panel defines a fitted cutout, and the hollow body defines a cavity interior to the hollow body and about continuous from the top end to the bottom end. The fitted cutout defines an opening from the outer surface to the cavity. A top panel contacts the top end of the hollow body, and a bottom panel contacts the bottom end of the hollow body.

DETAILED DESCRIPTION

Figure 1:
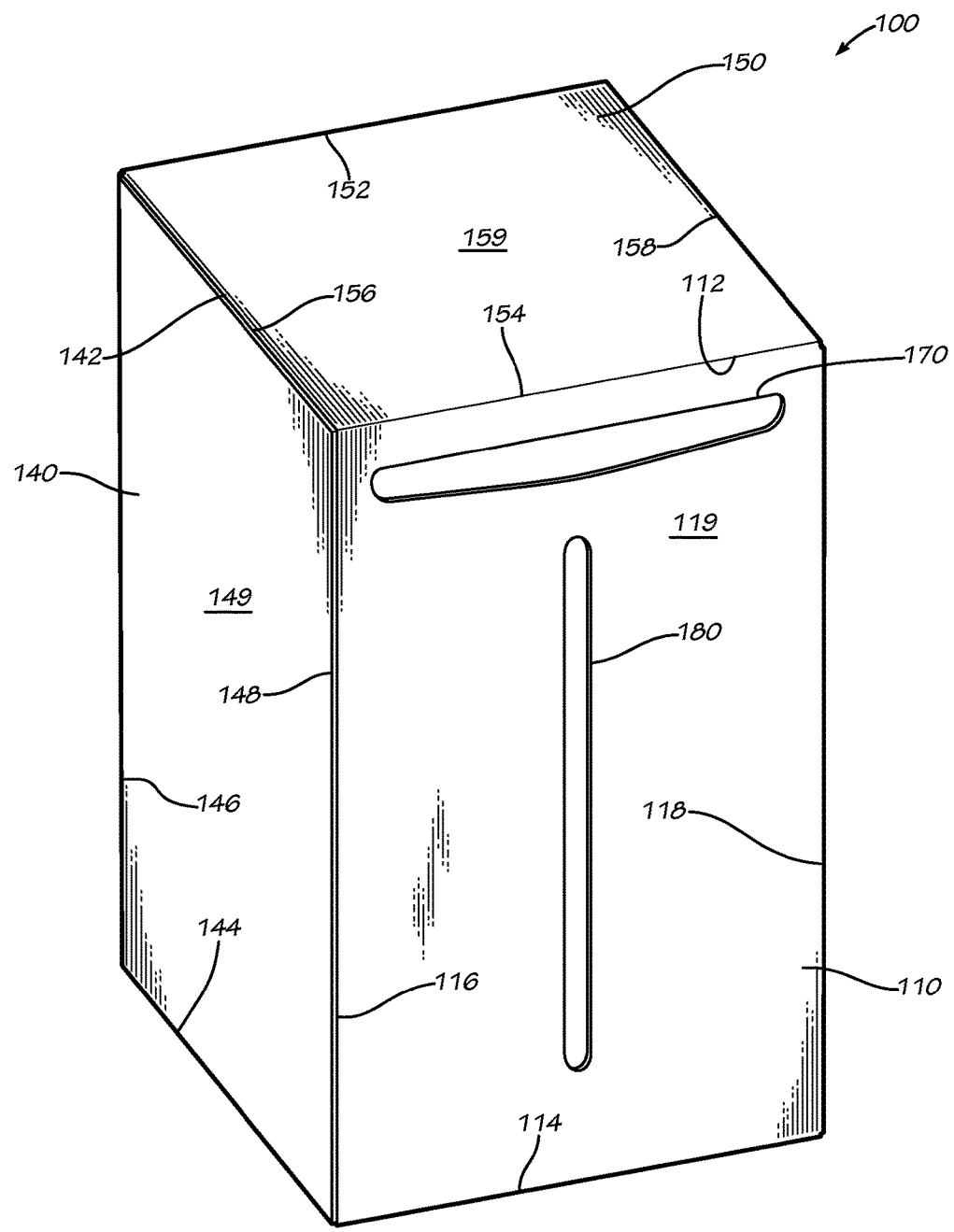
FIG. 1 is a perspective view of a recyclable container in accord with one embodiment of the disclosure.

Disclosed is a recyclable container. As seen in FIG. 1, one embodiment of a recyclable container 100 is disclosed for storing and disposing of recyclable refuse. The recyclable container 100 has a rectangular cross-section and includes four side panels including a front side panel 110, a right side panel 120 (not shown), a back side panel 130 (not shown), and a left side panel 140. Each side panel has a top end, a bottom end, a left end, a right end, an outer surface, and an inner surface. Front side panel 110 has top end 112, bottom end 114, left end 116, right end 118, outer surface 119, and inner surface 117 (not shown). Left side panel 140 has top end 142, bottom end 144, left end 146, right end 148, outer surface 149, and inner surface 147 (not shown). Although the current embodiment has four sides and a rectangular cross-section, no particular shape or number of sides need limit the disclosure. In various embodiments, the recyclable container 100 is dimensioned to fit under a desk and to assemble and to disassemble with ease, allowing the user convenient and inexpensive recycling. In various other embodiments, the recyclable container 100 may be tamper-proof and may be incapable of disassembly without damaging the recyclable container 100.

A top panel 150 and a bottom panel 160 (not shown) provide an enclosure as defined by the recyclable container 100. The top panel 150 has a back end 152, a front end 154, a left end 156, a right end 158, an outer surface 159, and an inner surface 157 (not shown). The top panel 150 acts as a lid to contain contents inside the recyclable container 100.

Figure 2:
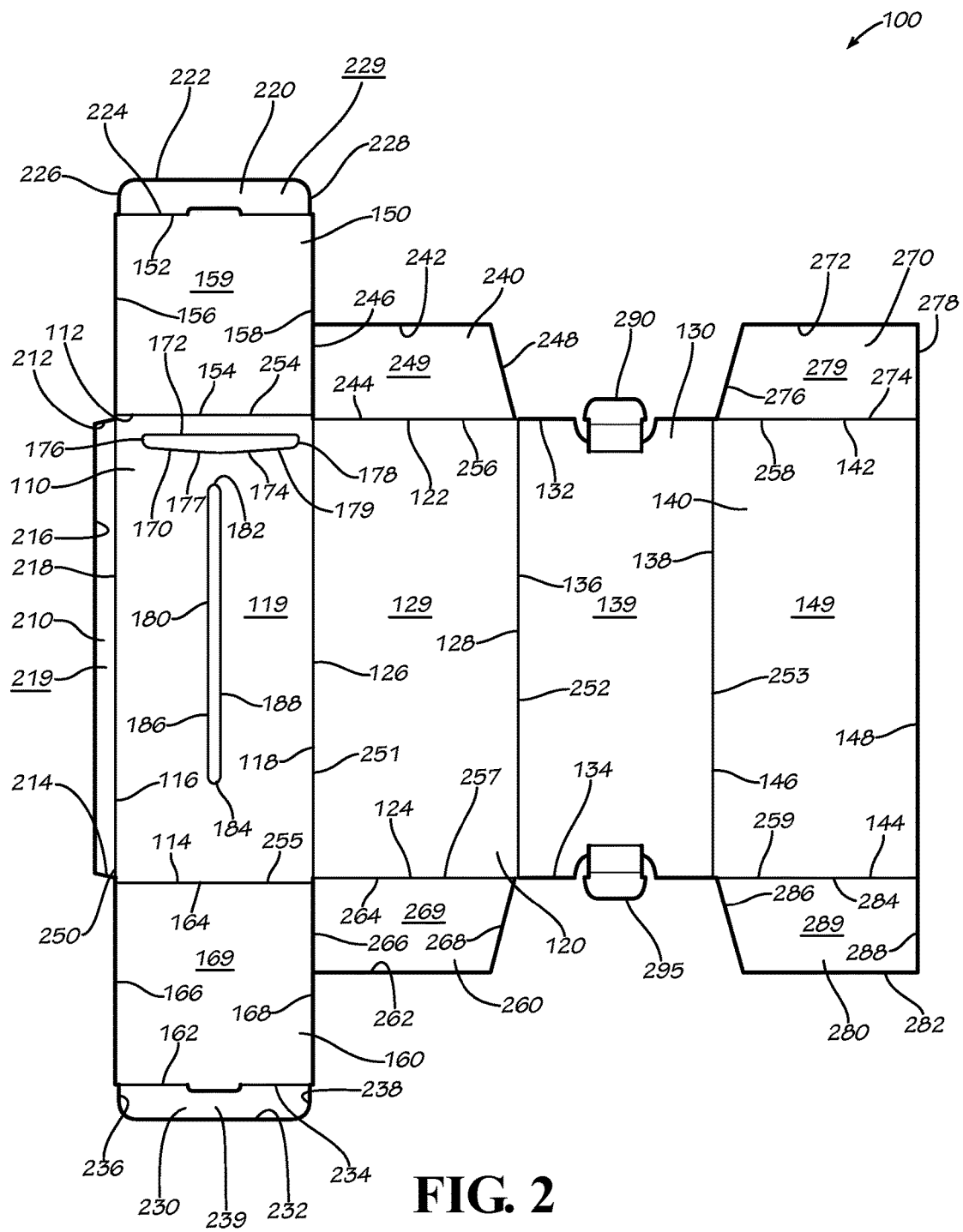
FIG. 2 is a schematic view of a blank formable into the recyclable container of FIG. 1.

The front side panel 110 in the current embodiment defines a fitted cutout 170 and an indicator cutout 180. Both the fitted cutout 170 and indicator cutout 180 are holes in the front side panel 110. The fitted cutout 170 can be of any shape but may be a shape suggestive of the type of recyclable refuse to be placed in the recyclable container 100 in some embodiments. For example, in the current embodiment, the fitted cutout 170 is a substantially horizontal slit meant to encourage placement of paper in the recyclable container 100 and to discourage placement of aluminum cans or other materials in the recyclable container 100. As seen in FIG. 2, the fitted cutout 170 has a top edge 172 that is about horizontal and about parallel to the top end 112 of the front side panel 110. The fitted cutout has a rounded left side edge 176 and a rounded right side edge 178. A bottom edge 174 of the fitted cutout 170 includes a left draft portion 177 and a right draft portion 179, both of which angle slightly with respect to the top end 112 of the front side panel 110 in the current embodiment. The angles of the left draft portion 177 and the right draft portion 179 produce a slight V-shape of the bottom edge 174.

The indicator cutout 180 need not be any specific shape, although it is a vertical slit in the current embodiment. The indicator cutout 180 provides a view to the inside of the recyclable container 100 to indicate the fill level of the recyclable container 100 without allowing recyclable refuse to fall out of the recyclable container 100. The indicator cutout 180 has a rounded top edge 182, a rounded bottom edge 184, a straight left edge 186, and a straight right edge 188 in the current embodiment, although variations of the indicator cutout 180 are included in this disclosure. Moreover, in some embodiments, no indicator cutout 180 will be included at all.

FIG. 2 is an outside view of a blank formable into the recyclable container 100 of FIG. 1. In the current embodiment, the recyclable container 100 is made of corrugated cardboard and is formed into the shape of FIG. 1 from a cardboard blank. Other material choices may obviate the blank arrangement of FIG. 2.

Right side panel 120 has a top end 122, a bottom end 124, a left end 126, a right end 128, an outer surface 129, and an inner surface 127 (not shown). Back side panel 130 has a top end 132, a bottom end 134, a left end 136, a right end 138, an outer surface 139, and an inner surface 137 (not shown). Bottom panel 160 has a back end 162, a front end 164, a left end 166, a right end 168, an outer surface 169, and an inner surface 167 (not shown).

Connected to the front side panel 110 is a connection panel 210. The connection panel 210 has a top end 212, a bottom end 214, a left end 216, a right end 218, an outer surface 219, and an inner surface 217 (not shown). In the current embodiment, the connection panel 210 is connected to the left end 116 of the front side panel 110, the connection being a bend line 250. Bend lines to which this disclosure refers are designed as weakened regions and may include a crease, a perforation, a series of perforations, or another arrangement to weaken the area of the bend line. In the current embodiment, all bend lines are creases. The top end 212 of the connection panel 210 is oriented at a downward angle with respect to the top end 112 of the front side panel 110. Similarly, the bottom end 214 of the connection panel 210 is oriented at an upward angle with respect to the bottom end 114 of the front side panel 110. The result is that the linear length of the left end 216 of the connection panel 210 is shorter than the linear length of the right end 218 of the connection panel 210. This allows the connection panel 210 to fold inside the recyclable container 100 when it is connected, as will be described later.

The top ends 112,122,132,142 of the side panels 110,120, 130,140, respectively, are not necessarily collinear. Also, the bottom ends 114,124,134,144 of the side panels 110,120, 130,140, respectively, are not necessarily collinear. Although top ends 122, 132, and 142 are generally collinear, top end 112 is slightly off-line from the other top ends 122,132,142. Likewise, although bottom ends 124, 134, and 144 are generally collinear, bottom end 114 is slightly off-line from the other bottom ends 124,134,144. This arrangement results in the right end 118 of the front side panel 110 having a linear length that is slightly longer than a linear length of the left end 126 of the right side panel 120.

A top fold tab 220 connects to the top panel 150. The top fold tab 220 has a terminating end 222, a panel end 224, a left end 226, a right end 228, an outer surface 229, and an inner surface 227 (not shown). Similarly, a bottom fold tab 230 connects to the bottom panel 160. The bottom fold tab 230 has a terminating end 232, a panel end 234, a left end 236, a right end 238, an outer surface 239, and an inner surface 237 (not shown). Further detail of the top fold tab 220 and bottom fold tab 230 will be provided in FIGS. 3 and 4.

Connected to right side panel 120 is a top liner panel 240. The top liner panel 240 has a terminating end 242, a connected end 244, a left end 246, a right end 248, an outer surface 249, and an inner surface 247 (not shown). In the current embodiment, the right end 248 is slanted such that its angle with respect to the top end 122 of the right side panel 120 is not orthogonal. A bottom liner panel 260 is connected to the right side panel 120. The bottom liner panel 260 has a terminating end 262, a connected end 264, a left end 266, a right end 268, an outer surface 269, and an inner surface 267 (not shown). In the current embodiment, the right end 268 is slanted such that it creates an angle with respect to the bottom end 124 of the right side panel 120 that is not orthogonal.

A top liner panel 270 is connected to the left side panel 140 as well. The top liner panel 270 has a terminating end 272, a connected end 274, a left end 276, a right end 278, an outer surface 279, and an inner surface 277 (not shown). In the current embodiment, the left end 276 is slanted such that it creates an angle with respect to the top end 142 of the left side panel 140 that is not orthogonal. A bottom liner panel 280 is connected to the left side panel 140. The bottom liner panel 280 has a terminating end 282, a connected end 284, a left end 286, a right end 288, an outer surface 289, and an inner surface 287 (not shown). In the current embodiment, the left end 286 is slanted such that it creates an angle with respect to the bottom end 144 of the left side panel 140 that is not orthogonal.

Connected to the back side panel 130 is a top lock tab 290. Also connected to the back side panel 130 is a bottom lock tab 295. The features of the top lock tab 290 and bottom lock tab 295 are discussed in further figures.

As previously described, the bend line 250 extends between right end 218 and left end 116 and allows the connection panel 210 to hingedly bend with respect to the front side panel 110. Other bend lines are also present in the blank of FIG. 2. Bend line 251 extends between the right end 118 of the front side panel 110 and the left end 126 of the right side panel 120. Bend line 252 extends between the right end 128 of the right side panel 120 and the left end 136 of the back side panel 130. Bend line 253 extends between the right end 138 of the back side panel 130 and the left end 146 of the left side panel 140. Bend line 254 extends between the top end 112 of the front side panel 110 and the front end 154 of the top panel 150. Bend line 255 extends between the bottom end 114 of the front side panel 110 and the front end 164 of the bottom panel 160. Bend line 256 extends between the top end 122 of the right side panel 120 and the connected end 244 of the top liner panel 240. Bend line 257 extends between the bottom end 124 of the right side panel 120 and the connected end 264 of the bottom liner panel 260. Bend line 258 extends between the top end 142 of the left side panel 140 and the connected end 274 of the top liner panel 270. Bend line 259 extends between the bottom end 144 of the left side panel 140 and the connected end 284 of the bottom liner panel 280. Although other bend lines are present, they will be discussed with respect to detail views.

Figure 3:
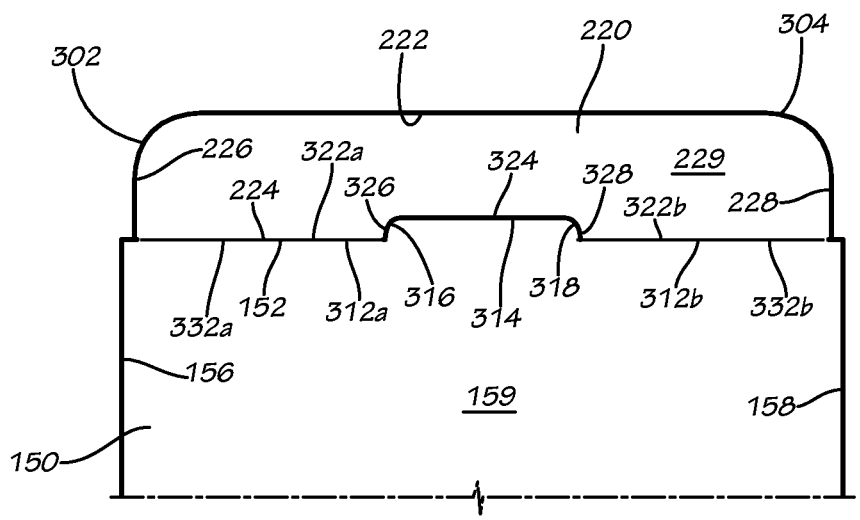
FIG. 3 is a close-up view of a top fold tab of the blank of FIG. 2.

FIG. 3 is a close-up view of the connection of the top fold tab 220 and the top panel 150. At the intersection of left end 226 with terminating end 222 is a rounded corner 302. At the intersection of the right end 228 with the terminating end 222 is a rounded corner 304.

Back end 152 has a linear length as measured from left end 156 to right end 158. Panel end 224 has a linear length as measured from left end 226 to right end 228. The linear length of the back end 152 is longer than the linear length of the panel end 224 in the current embodiment, as will be discussed further.

The back end 152 and the panel end 224 are collinear, and all the portions of both features are also coordinating. The back end 152 has a left side portion 312*a* and a right side portion 312*b*. The left side portion 312*a* connects to a left extension portion 316 which is about orthogonal to the left side portion 312*a*. The left extension portion 316 connects to an extended portion 314 which is about orthogonal to the left extension portion 316 and about parallel to the left side portion 312*a*. The extended portion 314 is connected to a right extension portion 318 that is about orthogonal to the extension portion 314 and is about parallel to the left extension portion 316. The right extension portion 318 connects to the right side portion 312*b*.

The panel end 224 of the top fold tab 220 includes a left side portion 322*a* and a right side portion 322*b*. A left contraction portion 326 is connected to the left side portion 322*a* and is about orthogonal to the left side portion 322*a*. A contracted portion 324 is connected to the left contraction portion 326 and is about orthogonal to the left contraction portion 326 and about parallel to the left side portion 322*a*. A right contraction portion 328 is connected to the contracted portion 324 and is about orthogonal to the contracted portion 324 and about parallel to the left contraction portion 326. The right side portion 322*b* is connected to the right contraction portion 328.

As described, some portions of the panel end 224 coordinate with portions of the back end 152.

However, not all features are connected. Left side portion 312*a* is connected to left side portion 322*a* by bend line 332*a*. Right side portion 312*b* is connected to right side portion 322*b* by bend line 332*b*. No other connections exist between the panel end 224 and the back end 152. As such, although other portions are coordinating, they are not connected.

Figure 4:
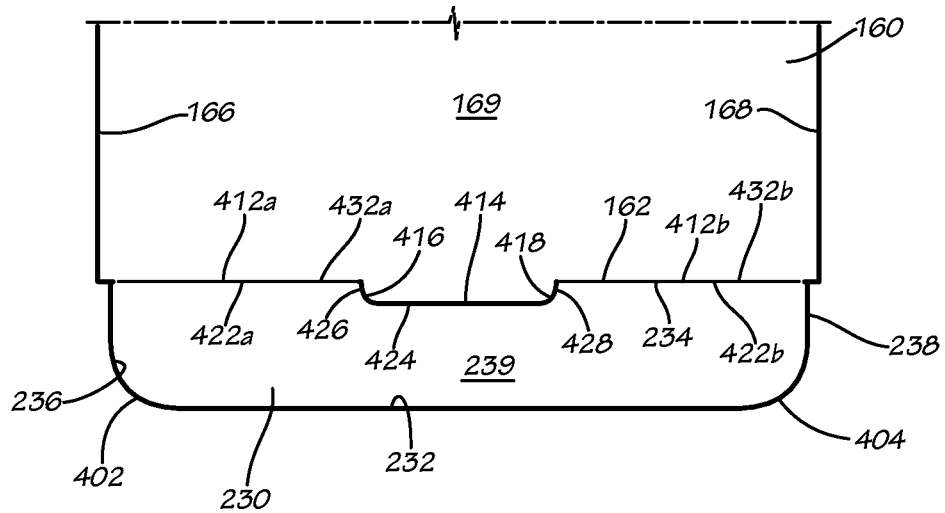
FIG. 4 is a close-up view of a bottom fold tab of the blank of FIG. 2.

FIG. 4 is a close-up view of the connection of the bottom fold tab 230 and the bottom panel 160. At the intersection of left end 236 with terminating end 232 is a rounded corner 402. At the intersection of the right end 238 with the terminating end 232 is a rounded corner 404.

Back end 162 has a linear length as measured from left end 166 to right end 168. Panel end 234 has a linear length as measured from left end 236 to right end 238. The linear length of the back end 162 is longer than the linear length of the panel end 234 in the current embodiment.

The back end 162 and the panel end 234 are collinear, and all the portions of both features are also coordinating. The back end 162 has a left side portion 412*a* and a right side portion 412*b*. The left side portion 412*a* connects to a left extension portion 416 which is about orthogonal to the left side portion 412*a*. The left extension portion 416 connects to an extended portion 414 which is about orthogonal to the left extension portion 416 and about parallel to the left side portion 412*a*. The extended portion 414 is connected to a right extension portion 418 that is about orthogonal to the extended portion 414 and is about parallel to the left extension portion 416. The right extension portion 418 connects to the right side portion 412*b*.

The panel end 234 of the bottom fold tab 230 includes a left side portion 422*a* and a right side portion 422*b*. A left contraction portion 426 is connected to the left side portion 422*a* and is about orthogonal to the left side portion 422*a*. A contracted portion 424 is connected to the left contraction portion 426 and is about orthogonal to the left contraction portion 426 and about parallel to the left side portion 422*a*. A right contracting portion 428 is connected to the contracted portion 424 and is about orthogonal to the contracted portion 424 and about parallel to the left contraction portion 426. The right side portion 422*b* is connected to the right contraction portion 428.

As described, some portions of the panel end 234 and the back end 162 are coordinating. However, not all features are connected. Left side portion 412*a* is connected to left side portion 422*a* by bend line 432*a*. Right side portion 412*b* is connected to right side portion 422*b* by bend line 432*b*. No other connections exist between the panel end 234 and the back end 162. As such, although other features are coordinating, they are not connected.

Figure 5:
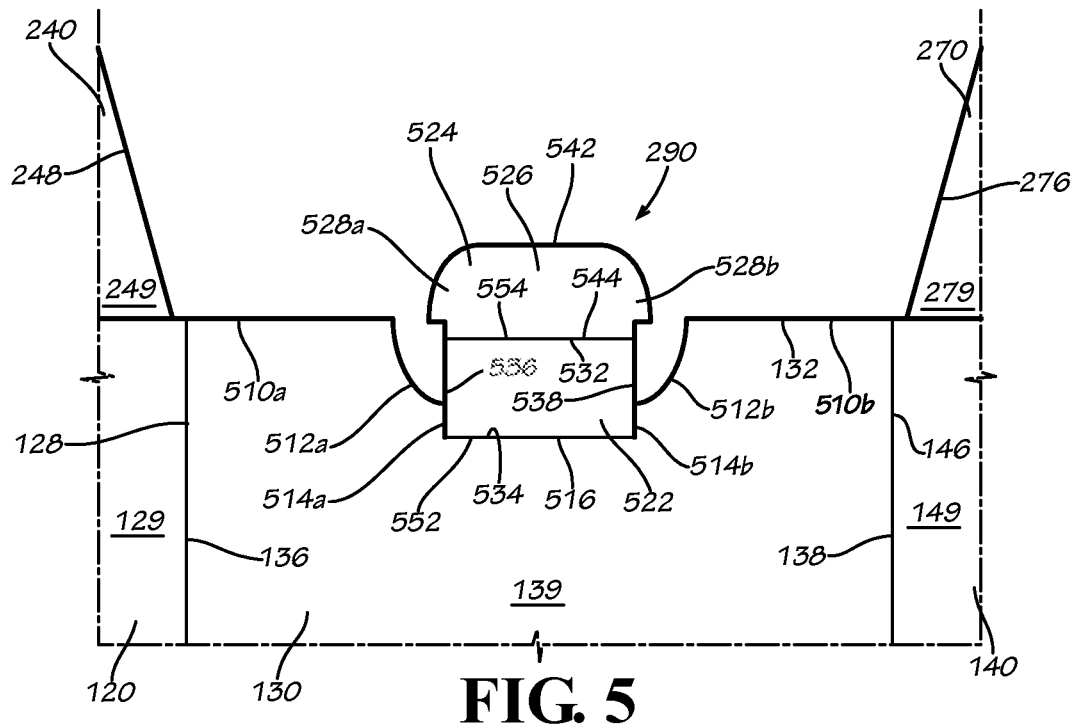
FIG. 5 is a close-up view of a top lock tab of the blank of FIG. 2.

As seen in FIG. 5, the top end 132 includes several portions, including a left flat portion 510*a*, a right flat portion 510*b*, a left curved portion 512*a*, a right curved portion 512*b*, a left contracting portion 514*a*, right contracting portion 514*b*, and a central flat portion 516.

The top lock tab 290 has a flex portion 522 and an insertion portion 524. The flex portion 522 is generally rectangular and has a distal end 532, a connected end 534, a left end 536, and a right end 538. The insertion portion 524 has a shank 526, a left ear 528*a*, and a right ear 528*b*. The left ear 528*a* and the right ear 528*b* are connected to the shank 526 and protrude outwardly from the shank 526. The insertion portion 524 has a connected end 544 and a terminating end 542.

The top lock tab 290 is connected to the back side panel 130 only between connected end 534 and central flat portion 516. A bend line 552 extends between connected end 534 and central flat portion 516. The top lock tab 290 is not connected to the back side panel 130 along any other end. As such, the entire top lock tab 290 may hinge with respect to the back side panel 130. Another bend line 554 extends between connected end 544 and distal end 532. The bend line 554 allows the top lock tab 290 to bend on itself such that the insertion portion 524 may be bent with respect to the flex portion 522.

Figure 6:
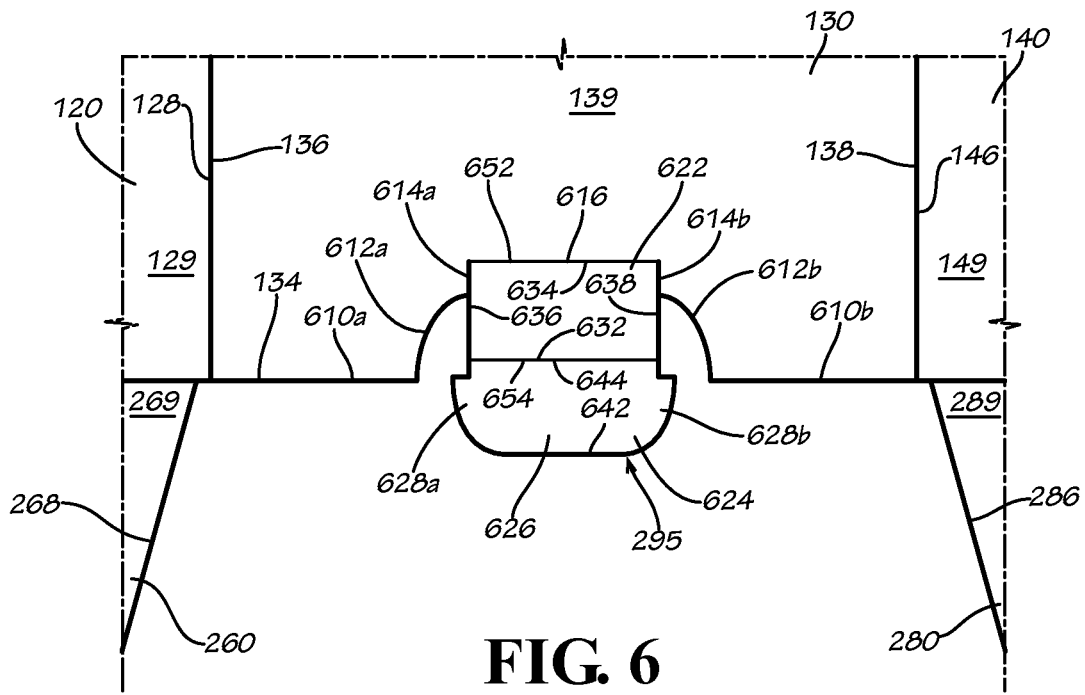
FIG. 6 is a close-up view of a bottom lock tab of the blank of FIG. 2.

As seen in FIG. 6, the bottom end 134 includes several portions, including a left flat portion 610*a*, a right flat portion 610*b*, a left curved portion 612*a*, a right curved portion 612*b*, a left contracting portion 614*a*, right contracting portion 614*b*, and a central flat portion 616.

The bottom lock tab 295 has a flex portion 622 and an insertion portion 624. The flex portion 622 is generally rectangular and has a distal end 632, a connected end 634, a left end 636, and a right end 638. The insertion portion 624 has a shank 626, a left ear 628*a*, and a right ear 628*b*. The left ear 628*a* and the right ear 628*b* are connected to the shank 626 and protrude outwardly from the shank 626. The insertion portion 624 has a connected end 644 and a terminating end 642.

The bottom lock tab 295 is connected to the back side panel 130 only between connected end 634 and central flat portion 616. A bend line 652 extends between connected end 634 and central flat portion 616. The bottom lock tab 295 is not connected to the back side panel 130 along any other end. As such, the entire bottom lock tab 295 may hinge with respect to the back side panel 130. Another bend line 654 extends between connected end 644 and distal end 632. The bend line 654 allows the bottom lock tab 295 to bend on itself such that the insertion portion 624 may be bent with respect to the flex portion 622.

Figure 7:
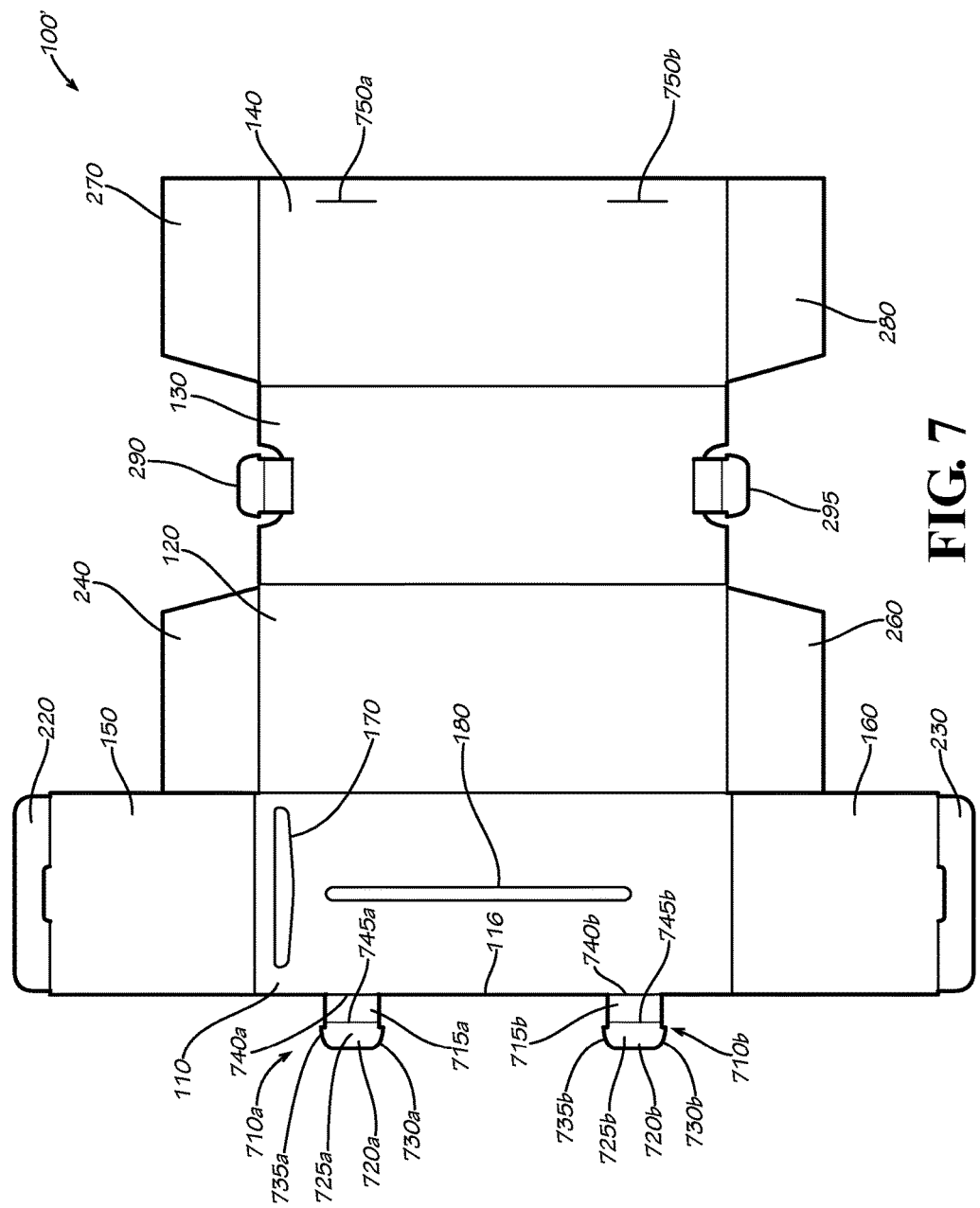
FIG. 7 is a schematic view of a blank formable into a recyclable container in accord with one embodiment of the disclosure.

FIG. 7 displays a blank of another embodiment of a recyclable container 100'. In this embodiment, there is no connection panel 210 (see FIG. 2). Instead, the connection panel 210 is replaced by insertable connection tabs 710*a,b*. Each insertable connection tab 710*a,b* has a flex portion 715*a,b* and an insertion portion 720*a,b*. Each insertion portion 720*a,b* includes a shank 725*a,b* and two opposing ears 730*a*,735*a* and 730*b*,735*b*. A bend line 740*a,b* extends between each flex portion 715*a,b* and the left end 116 of the front side panel 110 and allows each insertable connection tab 710*a,b* to be bent with respect to the front side panel 110. A bend line 745*a,b* extends between each flex portion 715*a,b* and each insertion portion 720*a,b* and allows bending of each insertion portion 720*a,b* with respect to each flex portion 715*a,b*.

Also included on the left side panel 140 are two slots 750*a,b*. The slots 750*a,b* are vertically aligned in the left side panel 140 and allow each insertion portion 720*a,b* of each insertable connection tab 710*a,b* to be inserted into each slot 750*a,b*. When each insertion portion 720*a,b* is inserted in each slot 750*a,b*, the ears 730*a,b* and 735*a,b* prevent the insertable connection tab 710a,b from being removed, retaining the recyclable container 100' in the rectangular shape of FIG. 1.

Figure 8:
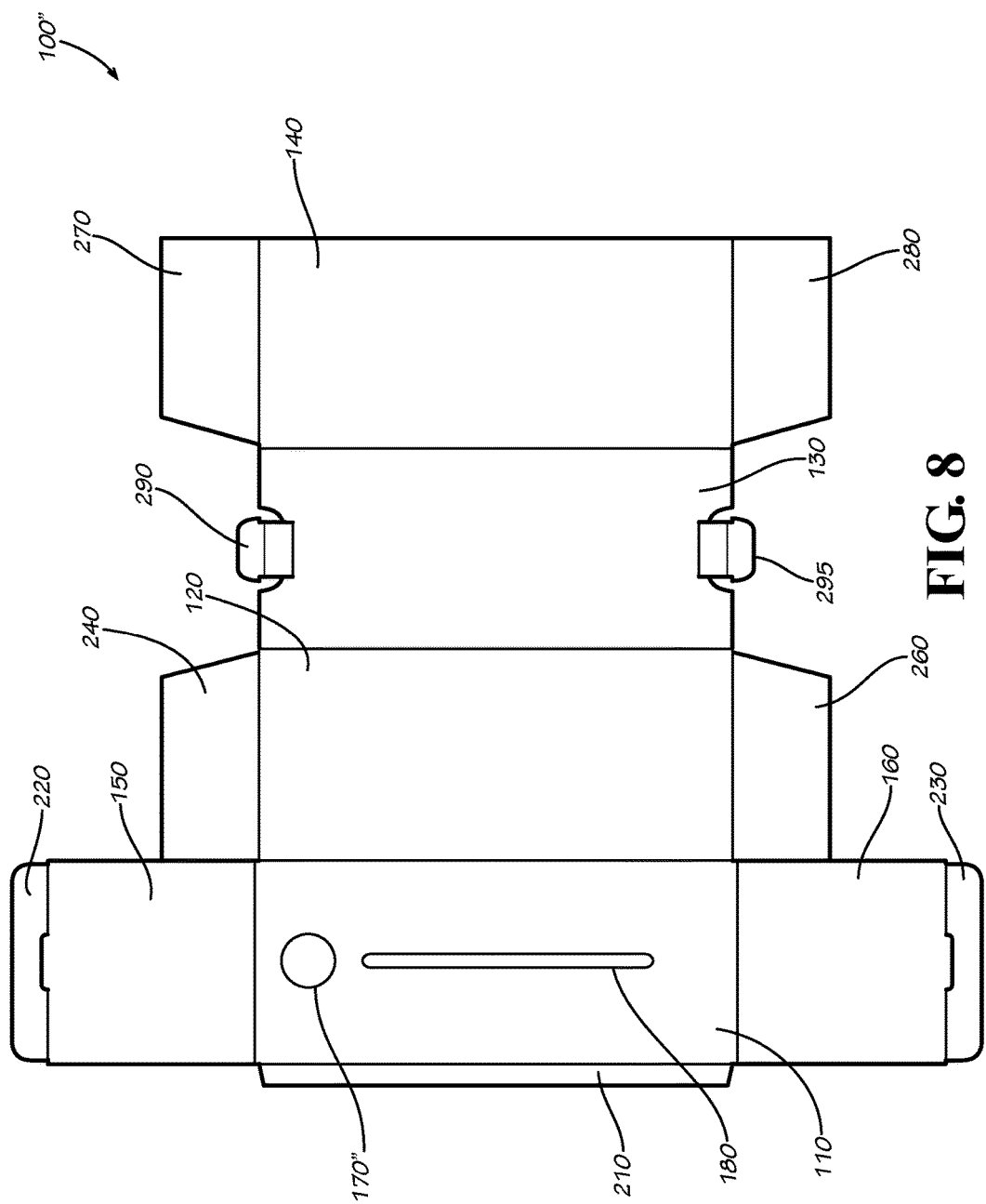
FIG. 8 is a schematic view of a blank formable into a recyclable container in accord with one embodiment of the disclosure.

FIG. 8 shows a blank of another embodiment of a recyclable container 100". In the current embodiment, the fitted cutout 170" is circular to encourage the placement of recyclable beverage containers in the recyclable container 100". Other features of this embodiment are substantially the same as in the recyclable container 100 of FIG. 2.

Figure 9:
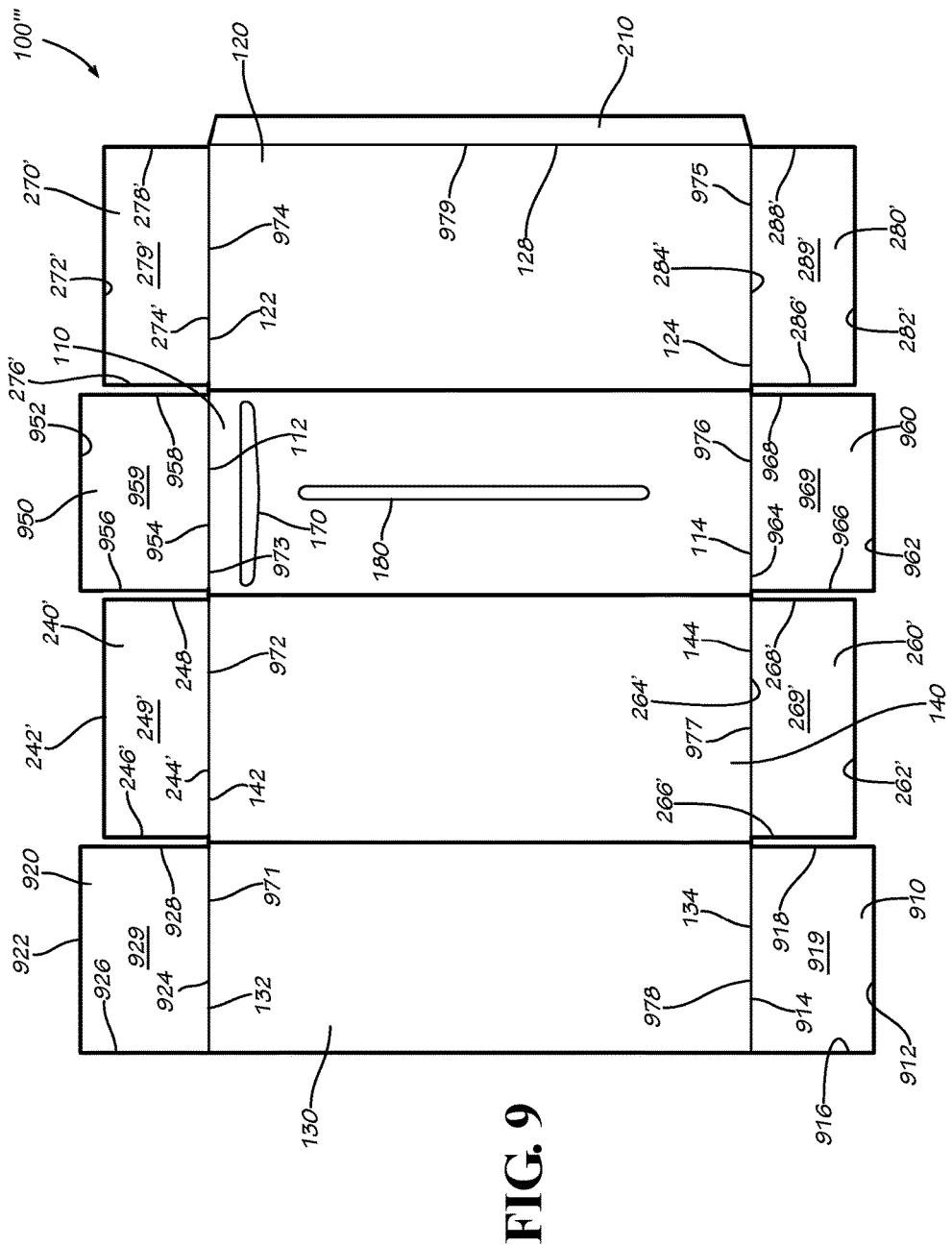
FIG. 9 is a schematic view of a blank formable into a recyclable container in accord with one embodiment of the disclosure.

FIG. 9 shows a blank of another embodiment of a recyclable container 100'''. This embodiment does not include the top lock tab 290 or bottom lock tab 295 of the blank of FIG. 2. Instead, functions performed by those missing features are performed by taping or gluing other parts and features. The recyclable container 100''' includes the back side panel 130, the left side panel 140, the front side panel 110, and the right side panel 120, previously described. A top liner panel 240' having a terminating end 242', a connected end 244', a left end 246', a right end 248', an outer surface 249', and an inner surface 247' (not shown) is connected to the left side panel 140. A bend line 972 extends between the top end 142 of the left side panel 140 and the connected end 244' of the top liner panel 240'. A bottom liner panel 260' having a terminating end 262', a connected end 264', a left end 266', a right end 268', an outer surface 269', and an inner surface 267' (not shown) is connected to the left side panel 140'. A bend line 977 extends between the bottom end 144 of the left side panel 140 and the connected end 264' of the bottom liner panel 260'.

A top liner panel 270' having a terminating end 272', a connected end 274', a left end 276', a right end 278', an outer surface 279', and an inner surface 277' (not shown) is connected to the right side panel 120. A bend line 974 extends between the top end 122 of the right side panel 120 and the connected end 274' of the top liner panel 270'. A bottom liner panel 280' having a terminating end 282', a connected end 284', a left end 286', a right end 288', an outer surface 289', and an inner surface 287' (not shown) is connected to the right side panel 120. A bend line 975 extends between the bottom end 124 of the right side panel 120 and the connected end 284' of the bottom liner panel 280'. It should be noted that the recyclable container 100''' includes straight (not slanted) ends on its liner panels 240',260',270',280' because the recyclable container 100''' includes features designed to be taped together and not inserted in a key/fit or insertable relationship.

A top panel flap 950 having a terminating end 952, a connected end 954, a left end 956, a right end 958, an outer surface 959, and an inner surface 957 (not shown) is connected to the front side panel 110. A bend line 973 extends between the top end 112 of the front side panel 110 and the connected end 954 of the top panel flap 950. A bottom panel flap 960 having a terminating end 962, a connected end 964, a left end 966, a right end 968, an outer surface 969, and an inner surface 967 (not shown) is connected to the front side panel 110. A bend line 976 extends between the bottom end 114 of the front side panel 110 and the connected end 964 of the bottom panel flap 960.

A top panel flap 920 having a terminating end 922, a connected end 924, a left end 926, a right end 928, an outer surface 929, and an inner surface 927 (not shown) is connected to the back side panel 130. A bend line 971 extends between the top end 132 of the back side panel 130 and the connected end 924 of the top panel flap 920. A bottom panel flap 910 having a terminating end 912, a connected end 914, a left end 916, a right end 918, an outer surface 919, and an inner surface 917 (not shown) is connected to the back side panel 130. A bend line 978 extends between the bottom end 134 of the back side panel 130 and the connected end 914 of the bottom panel flap 910.

Although some other features of the recyclable container 100''' of FIG. 9 are similar to features of the recyclable container 100 of FIG. 2, the containers are not exact. For example, the connection panel 210 of the recyclable container 100''' of the embodiment of FIG. 9 connects to the right end 128 of the right side panel 120 by a bend line 979, while the connection panel 210 of the recyclable container 100 of FIG. 2 connects to the left end 116 of the front side panel 110. Also, none of the connections of features of the recyclable container 100''' of the embodiment of FIG. 9 are connected by mechanical insertion or interlocking, but instead are connected by gluing, taping, or other non-locking attachments or connections.

Figure 10:
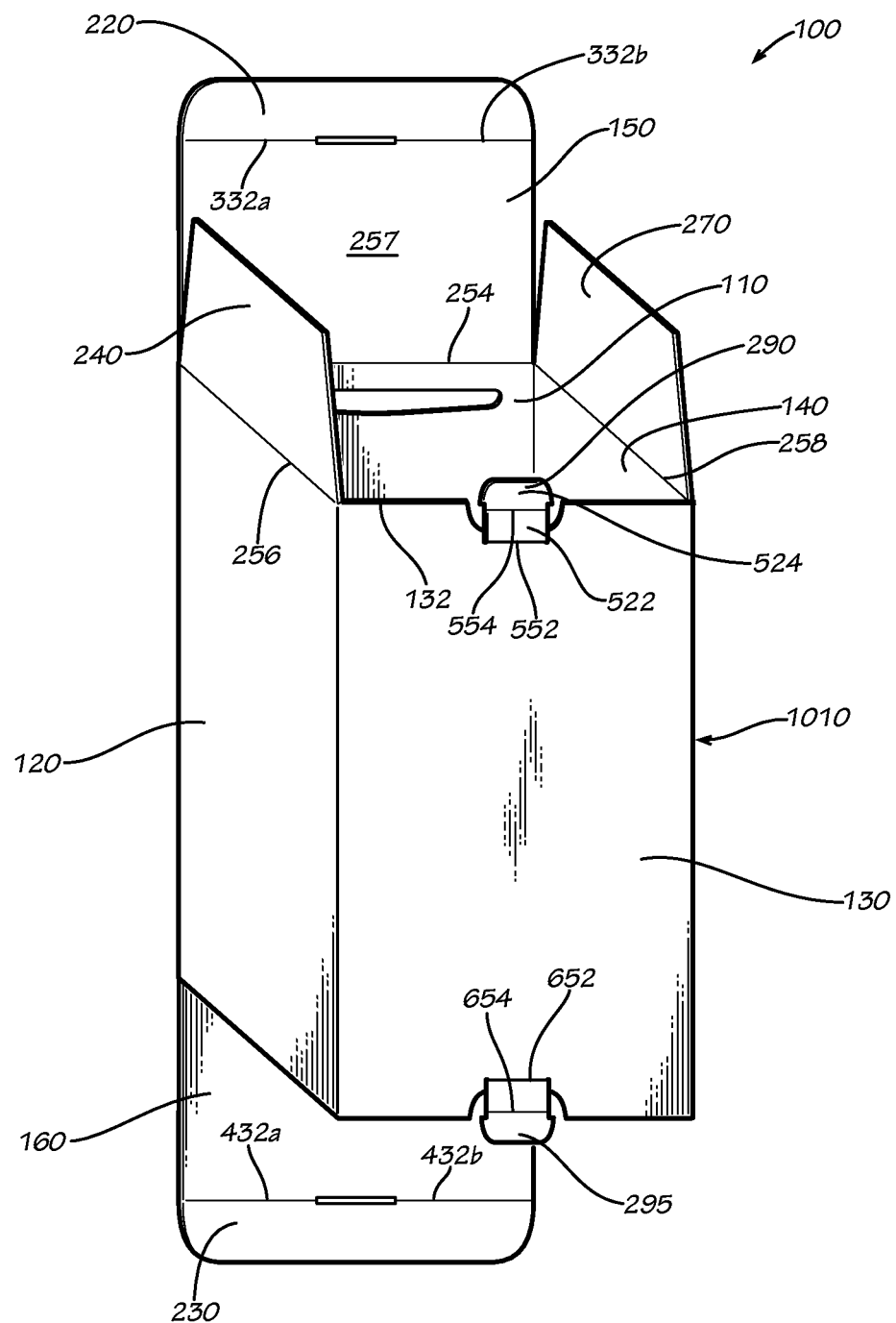
FIG. 10 is a perspective view of the recyclable container of FIG. 1 in assembly.

When the front side panel 110, right side panel 120, back side panel 130, and left side panel 140 from the blank of FIG. 2 are arranged, the parts together form a hollow body 1010, as seen in FIG. 10. From this arrangement, the top panel 150 and the bottom panel 160 must be folded to produce a closed enclosure having a cavity inside the recyclable container 100.

To assemble the recyclable container 100, the top lock tab 290 is bent outwardly with respect to back side panel 130 along bend line 552 to provide clearance. The insertion portion 524 is then bent with respect to the flex portion 522 along bend line 554. The top fold tab 220 is then bent with respect to the top panel 150 along bend lines 332a,b such that the top fold tab 220 hinges toward the inside of the hollow body 1010. Similarly, the bottom lock tab 295 is bent outwardly with respect to back side panel 130 along bend line 652 to provide clearance. The insertion portion 624 is then bent with respect to the flex portion 622 along bend line 654. The bottom fold tab 230 is then bent with respect to the bottom panel 160 along bend lines 432a,b such that the bottom fold tab 230 hinges toward the inside of the hollow body 1010. As described earlier, the connection panel 210 is folded inside the recyclable container 100 such that it is not viewable from the outside of the recyclable container 100. The connection panel 210 is glued to the left side panel 140.

Figure 11:
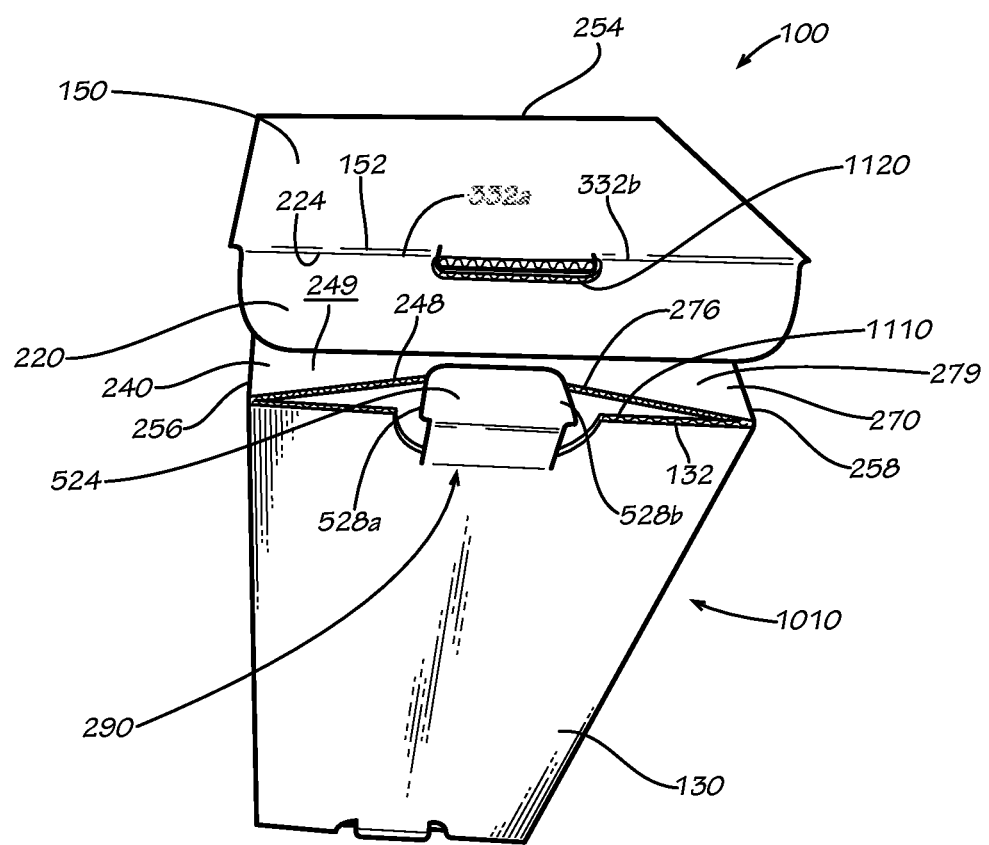
FIG. 11 is a perspective view of the recyclable container of FIG. 1 in assembly.

As seen in FIG. 11, each top liner panel 240,270 is hinged inwardly along each bend line 256,258, respectively. The top panel 150 and top fold tab 220 are then hinged inwardly along bend line 254 until the inner surface 157 of the top panel 150 rests against the outer surfaces 249,279 of the top liner panels 240,270. The right end 248 of the top liner panel 240 is slanted, and the left end 276 of the top liner panel 270 is slanted. Along with the top end 132 of the back side panel 130, the right end 248 and the left end 276 form a fold tab slot 1110 into which the top fold tab 220 is inserted. When the top fold tab 220 is bent inwardly, it is bent along its bend lines 332a,b and not along any other part of the back end 152. Bending along bend lines 332a,b but not along other parts of the back end 152 creates a lock tab slot 1120. When the top fold tab 220 is inserted into the fold tab slot 1110, the lock tab slot 1120 is exposed. The insertion portion 524 of the top lock tab 290 is inserted into the lock tab slot 1120 so that the left ear 528a and the right ear 528b can hold the insertion portion 524 into the lock tab slot 1120 and secure the top panel 150 onto the hollow body 1010. As discussed earlier, the linear length of the back end 152 is longer than the linear length of the panel end 224 in the current embodiment. This arrangement allows the top fold tab 220 to be inserted into the fold tab slot 1110 while providing a flush and finished joint between the panel end 224 and the top end 132. This arrangement allows the recyclable container 100 to be dismantled without destroying the connections.

A similar procedure occurs for the bottom panel 160. The bottom lock tab 295 is bent outwardly with respect to back side panel 130 along bend line 652 to provide clearance. The insertion portion 624 is then bent with respect to the flex portion 622 along bend line 654. The bottom fold tab 230 is then hinged with respect to the bottom panel 160 along bend lines 432a,b such that the bottom fold tab 230 hinges toward the inside of the hollow body 1010.

Each bottom liner panel 260,280 is hinged inwardly along each bend line 257,259, respectively. The bottom panel 160 and bottom fold tab 230 are then hinged inwardly along bend line 255 until the inner surface 167 of the bottom panel 160 rests against the outer surfaces 269,289 of the bottom liner panels 260,280. The right end 268 of the bottom liner panel 260 is slanted, and the left end 286 of the bottom liner panel 280 is slanted. Along with the bottom end 134 of the back side panel 130, the right end 268 and the left end 286 form a fold tab slot (not shown) into which the bottom fold tab 230 is inserted. When the bottom fold tab 230 is bent inwardly, it is hinged along its bend lines 432a,b and not along any other part of the back end 152. Bending along bend lines 432a,b but not along other parts of the back end 152 creates a lock tab slot (not shown). When the bottom fold tab 230 is inserted into the fold tab slot (not shown), the lock tab slot (not shown) is exposed. The insertion portion 624 of the bottom lock tab 295 is inserted into the lock tab slot (not shown) so that the left ear 628a and the right ear 628b can hold the insertion portion 624 into the lock tab slot (not shown) and secure the bottom panel 160 onto the hollow body 1010. As discussed earlier, the linear length of the back end 162 is longer than the linear length of the panel end 234 in the current embodiment. This arrangement allows the top fold tab 220 to be inserted into the fold tab slot 1110 while providing a flush and finished joint between the panel end 224 and the top end 132.

As stated above, the linear length of the right end 118 of the front side panel 110 is slightly longer than the linear length of the left end 126 of the right side panel 120. When the recyclable container 100 is formed into the configuration of FIG. 11, this longer length allows the top panel 150 and bottom panel 160 to fold over the top liner panels 240,270 and the bottom liner panels 260,280, respectively, without mechanical interference.

Figure 12:
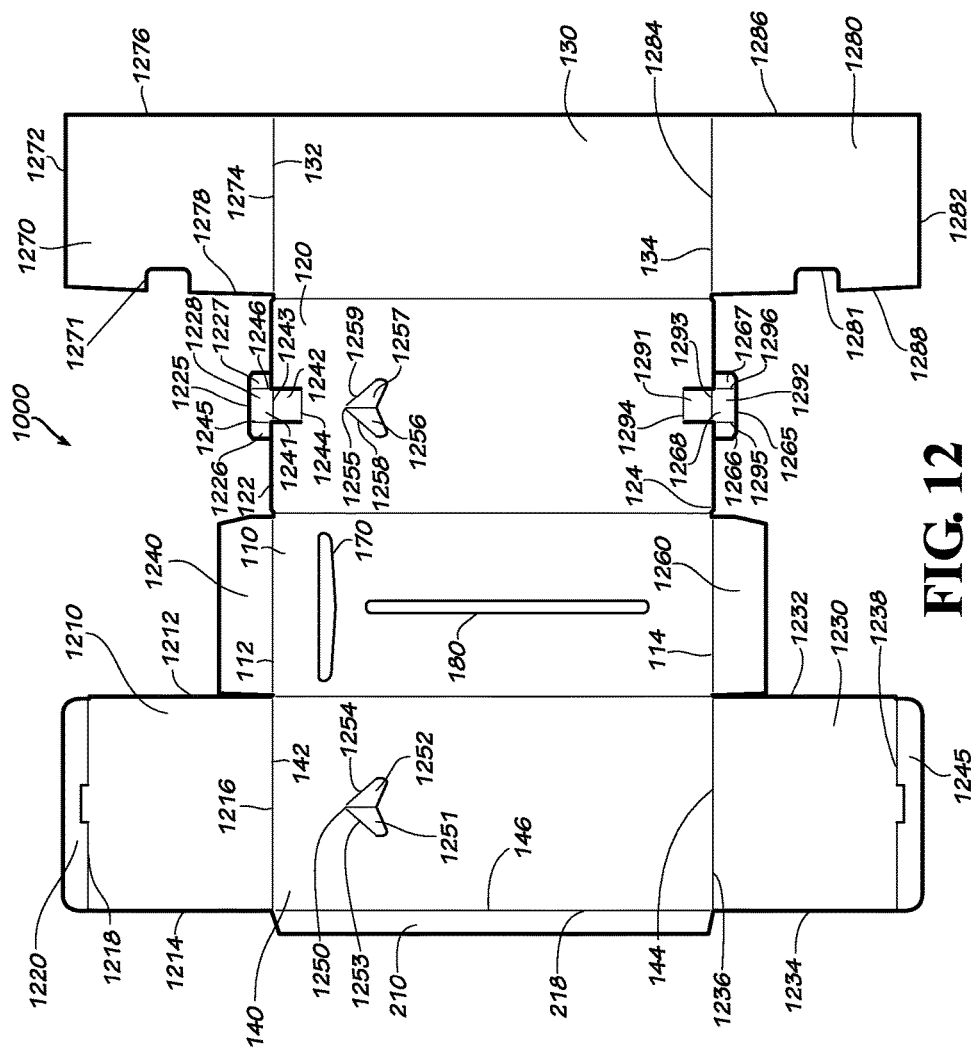
FIG. 12 is a schematic view of a blank formable into a recyclable container in accord with one embodiment of the disclosure.

Another embodiment of a recyclable container 1000 is seen in FIG. 12. The embodiment of FIG. 12 includes front side panel 110, right side panel 120, back side panel 130, and left side panel 140. Connection panel 210 is connected by its right end 218 to left end 146 of left side panel 140. The embodiment includes fitted cutout 170 and indicator cutout 180.

A top panel 1210 is connected to the top end 142 of the left side panel 140 while a bottom panel 1230 is connected to the bottom end 144 of the left side panel 140. The top panel 1210 has a front end 1212, a back end 1214, a left end 1216, and a right end 1218. A top fold tab 1220 is connected to the top panel 1210 by the right end 1218. The bottom panel 1230 includes a front end 1232, a back end 1234, a left end 1236, and a right end 1238. A bottom fold tab 1245 connects to the right end 1238 of the bottom panel 1230.

A top liner panel 1240 is connected to the top end 112 of the front panel 110. A bottom liner panel 1260 is connected to the bottom end 114 of the front panel 110. A top security liner 1270 is connected to top end 132 of the back panel 130 and includes a front end 1272, a back end 1274, a left end 1276, and a right end 1278. A bottom security liner 1280 is connected to bottom end 134 of the back panel 130 and includes a front end 1282, a back end 1284, a left end 1286, and a right end 1288. The top security liner 1270 includes an attachment notch 1271 that is defined in the right end 1278 of the top security liner 1270. Similarly, the bottom security liner 1280 includes an attachment notch 1281 that is defined in the right end 1288 of the bottom security liner 1280. The attachment notches 1271,1281 are generally rectangular in the current embodiment, although they may be various shapes in other embodiments.

In the current embodiment, the connections of both the top panel 1210 and the bottom panel 1230 are security connections. Once the recyclable container 1000 is assembled, it cannot be unassembled without breaking or cutting. Connected to the top end 122 of the right side panel 120 is a security tab 1225. The security tab 1225 includes a left flap 1226 and a right flap 1227 that are each hingedly connected to a center portion 1228 by bend lines 1245 and 1246, respectively. The center portion 1228 has an upper portion 1241 and a lower portion 1242 that are connected by a bend line 1243. The lower portion 1242 is connected to the right side panel 120 by a bend line 1244.

Similarly, connected to the bottom end 124 of the right side panel 120 is a security tab 1265. The security tab 1265 includes a left flap 1266 and a right flap 1267 that are each hingedly connected to a center portion 1268 by bend lines 1295 and 1296, respectively. The center portion 1268 has an upper portion 1291 and a lower portion 1292 that are connected by a bend line 1293. The upper portion 1291 is connected to the right side panel 120 by a bend line 1294.

In assembly, the side panels 110,120,130,140 are folded as in other embodiments, and the connection panel 210 is connected to the back side panel 130 by glue. The top security liner 1270 and top liner panel 1240 are folded inwardly, covering the top of the recyclable container 1000. The top panel 1210 is then folded onto the top of the recyclable container 1000, and the top fold tab 1220 is folded and inserted into a space created between the top security liner 1270 and the right side panel 120.

The left flap 1226 and right flap 1227 are designed to fold with respect to the center portion 1228. Because the bend lines 1245,1246 are simply creases in cardboard in the current embodiment, the folding of the left flap 1226 and the right flap 1227 maintains resilience. Just like with recyclable container 100, the security tab 1225 is inserted into a tab slot (not shown) that is created by the folding of the top fold tab 1220 relative to the top panel 1210. When folded, the left flap 1226 and the right flap 1227 may be inserted into the tab slot. Once the left flap 1226 and the right flap 1227 pass through the tab slot, the resilience causes them to spring and unfold. The unfolding of the left flap 1226 and the right flap 1227 causes an interference with the tab slot so that the security tab 1225 may not be removed from the tab slot without breaking the security tab 1225 or another part of the recyclable container 1000.

Similarly, the bottom security liner 1280 and bottom liner panel 1260 are folded inwardly, covering the bottom of the recyclable container 1000. The bottom panel 1230 is then folded onto the bottom of the recyclable container 1000, and the bottom fold tab 1245 is folded and inserted into a space created between the bottom security liner 1280 and the right side panel 120.

The left flap 1266 and right flap 1267 are designed to fold with respect to the center portion 1268. Because the bend lines 1295,1296 are simply creases in cardboard in the current embodiment, the folding of the left flap 1266 and the right flap 1267 maintains resilience. Just like with recyclable container 100, the security tab 1265 is inserted into a tab slot (not shown) that is created by the folding of the bottom fold tab 1245 relative to the bottom panel 1230. When folded, the left flap 1266 and the right flap 1267 may be inserted into the tab slot. Once they pass through the tab slot, the resilience of the left flap 1266 and the right flap 1267 causes them to spring and unfold. The unfolding of the left flap 1266 and the right flap 1267 causes an interference with the tab slot so that the security tab 1265 may not be removed from the tab slot without breaking the security tab 1265 or another part of the recyclable container 1000.

Also depicted in the current embodiment are handle slots 1250,1255. Handle slot 1250 is located in left side panel 140. The handle slot 1250 is produced by a left flap 1251 and a right flap 1252. The left flap 1251 is connected to the left side panel 140 only by a bend line 1253. The right flap 1252 is connected to the left side panel 140 only by a bend line 1254. All other lines shown are not connected. Handle slot 1255 is located in right side panel 120. The handle slot 1255 is produced by a left flap 1256 and a right flap 1257. The left flap 1256 is connected to the right side panel 120 only by a bend line 1258. The right flap 1257 is connected to the right side panel 120 only by a bend line 1259. All other lines shown are not connected. Although the handle slots 1250, 1255 are depicted in the shape of the current embodiment, other handle shapes may be included in various embodiments.

Figure 13:
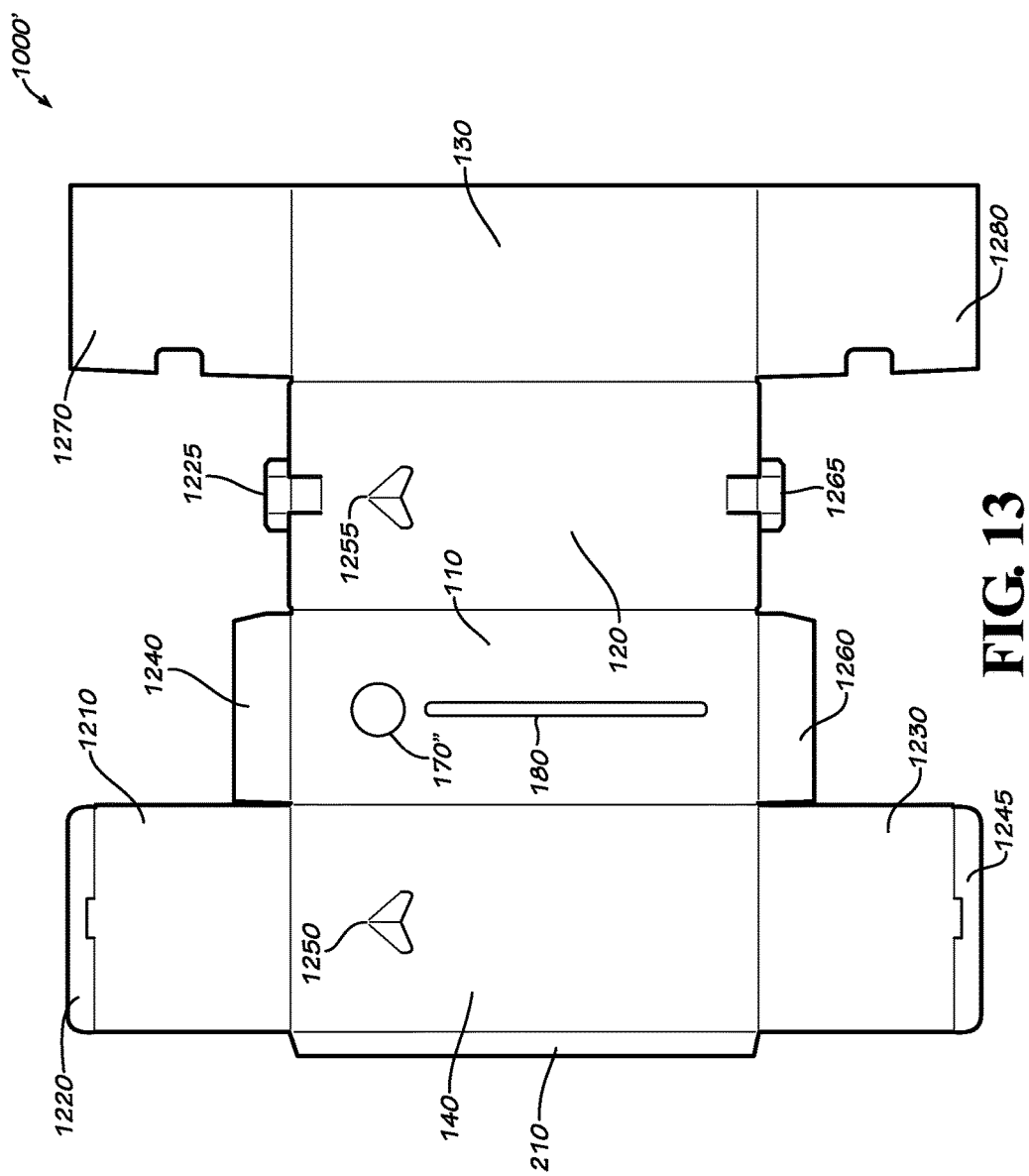
FIG. 13 is a schematic view of a blank formable into a recyclable container in accord with one embodiment of the disclosure.

In a further embodiment shown in FIG. 13, a recyclable container 1000' includes a similar configuration to recyclable container 1000. The recyclable container 1000' includes the fitted cutout 170" instead of fitted cutout 170.

Figure 14:
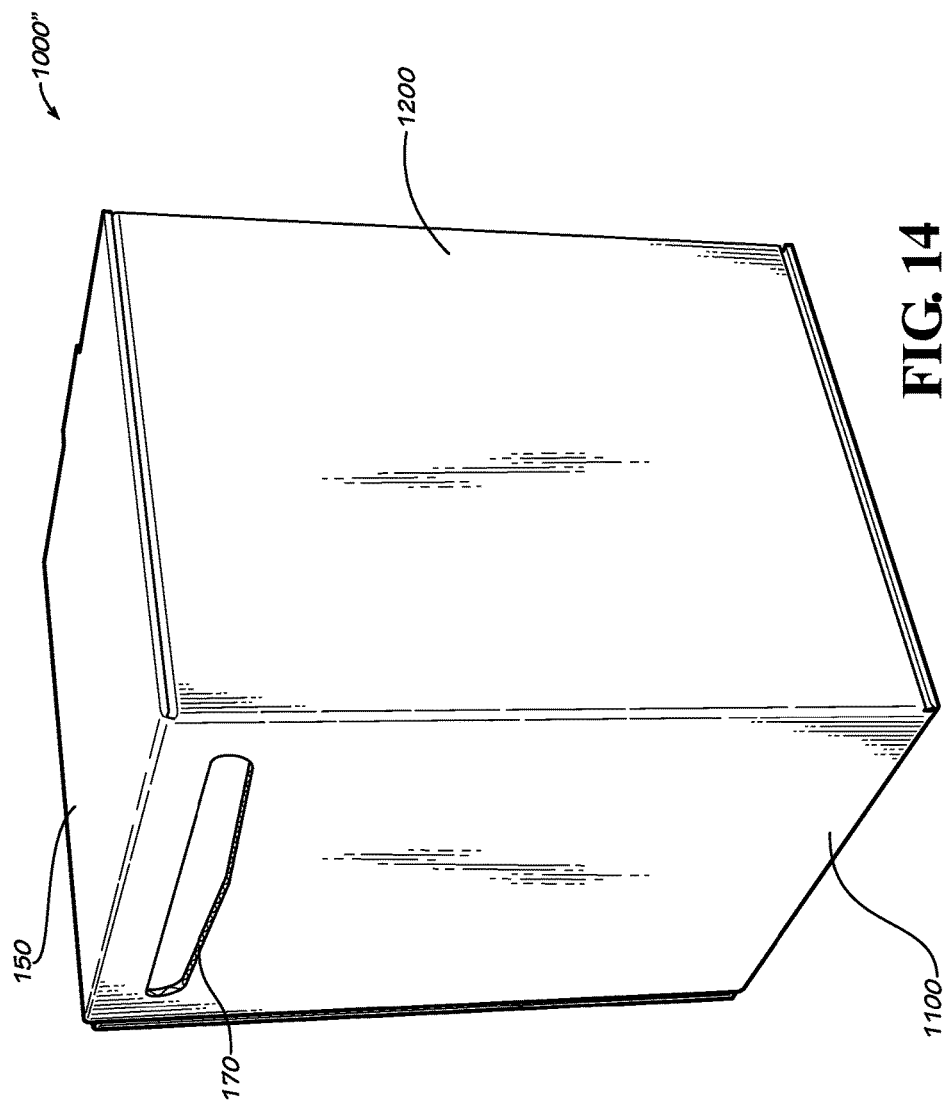
FIG. 14 is a perspective view of a recyclable container in accord with one embodiment of the disclosure.

In another embodiment, as shown in FIG. 14, a recyclable container 1000" is disclosed. Recyclable container 1000" includes front side panel 1100, right side panel 1200, back side panel 1300 (not shown), left side panel 1400 (not shown), top panel 150, and bottom panel 160. The recyclable container 1000" displays a shortened embodiment of the current disclosure, where other disclosed embodiments may be reconfigured for applications that require smaller dimensions. In the current embodiment, only the height of the recyclable container 1000" has changed from previously disclosed embodiments. However, the recyclable container 1000" is illustrative of changing other dimensions in of the disclosure, including (but not limited to) width, length, and thickness, in addition to changing the size and/or location of features. Additionally, no indicator cutout (180 in other embodiments) is shown in the recyclable container 1000" of the current embodiment. However, an indicator cutout (similar in appearance to indicator cutout 180) may be included in variations of the recyclable container 1000", and may be included on a side panel other than the front side panel 1100. No particular connection mechanism of another embodiment should be considered limiting on the recyclable container 1000".

This assembly configuration represents one of many possible assembly configurations. One skilled in the art will understand obvious variations of this assembly configuration are included within this disclosure, including variations of steps, combinations of steps, and dissections of steps, among others. Where materials are chosen for the elements of this assembly—particularly, corrugated cardboard—similar generally rigid material choices may also be used and would be obvious to one in the art, including corrugated cardboard or paper, linerboard, polymer, plastic, metal, alloy, wood, mesh, laminate, reinforced woven or nonwoven fabric, cellulose, composite, and combinations or mixtures of the foregoing, among others.

It should be emphasized that the embodiments described herein are merely possible examples of implementations, merely set forth for a clear understanding of the principles of the present disclosure. Many variations and modifications may be made to the described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

The invention claimed is:

1. A recyclable container comprising:
a hollow body having an outer surface and an inner surface, the hollow body including a top end, a bottom end, a first side panel, and a second side panel,
the first side panel defining
a fitted cutout and
an indicator cutout,
the second side panel including
a first lock tab, the first lock tab connected proximate a top end of the second side panel by a first bend line parallel to the top end of the second side panel and positioned between the top end of the second side panel and a bottom end of the second side panel, the first lock tab including a flex portion proximate the first bend line and an insertion portion distal the first bend line, the flex portion of the first lock tab and the insertion portion of the first lock tab connected to each other by a second bend line parallel to the first bend line and positioned between the first bend line and the top end of the first side panel, the insertion portion including a shank, a left ear, and a right ear, a distance between a distal end of the left ear of the first lock tab and a distal end of the right ear of the first lock tab greater than a distance between a left end of the flex portion of the first lock tab and a right end of the flex portion of the first lock tab, and
a second lock tab, the second lock tab connected proximate a bottom end of the second side panel by a third bend line parallel to a bottom end of the second side panel and positioned between the bottom end of the second side panel and the top end of the second side panel, the second lock tab including a flex portion proximate the third bend line and an insertion portion distal the third bend line, the flex portion of the second lock tab and the insertion portion of the second lock tab connected to each other by a fourth bend line parallel to the third bend line and positioned between the third bend line and the bottom end of the second side panel, the insertion portion including a shank, a left ear, and a right ear, a distance between a distal end of the left ear of the second lock tab and a distal end of the right ear of the second lock tab greater than a distance between a left end of the flex portion of the second lock tab and a right end of the flex portion of the second lock tab, the hollow body defining a cavity interior to the hollow body and about continuous from the top end to the bottom end, wherein the indicator cutout defines an opening from the outer surface to the cavity, wherein the fitted cutout defines an opening from the outer surface to the cavity, the fitted cutout defining a fitted cutout width and the inner surface of the hollow body defining a hollow body interior width, the fitted cutout width being less than the hollow body interior width, the fitted cutout being centered between a left end and a right end in the first side panel, the fitted cutout separated from the indicator cutout, no edge of the fitted cutout intersecting an edge of the indicator cutout, a first distance from the fitted cutout to the top end of the first side panel less than a second distance from the indicator cutout to the top end of the first side panel;

a top panel contacting the top end of the hollow body; and a bottom panel contacting the bottom end of the hollow body, the hollow body including a square cross-section, the recyclable container remaining vertical after placing the bottom end on a horizontal surface, an outside surface of the bottom panel touching the horizontal surface.

2. The recyclable container of claim 1, wherein the indicator cutout is a slit.

3. The recyclable container of claim 1, wherein the hollow body is made of corrugated cardboard.

4. The recyclable container of claim 1, wherein the fitted cutout is round.

5. The recyclable container of claim 1, wherein the fitted cutout is a substantially horizontal slit.

6. The recyclable container of claim 5, wherein the fitted cutout includes a bottom edge, the bottom edge being V-shaped and having a left draft portion and a right draft portion;

the left draft portion of the bottom edge of the fitted cutout extends from a rounded left side edge of the fitted cutout to the right draft portion of the bottom edge; and the right draft portion of the bottom edge of the fitted cutout extends from a rounded right side edge of the fitted cutout to the left draft portion of the bottom edge, each of the left draft portion and right draft portion of the bottom edge being straight and continuous.

7. The recyclable container of claim 1, wherein the top panel connects to the hollow body.

8. The recyclable container of claim 1, wherein the bottom panel connects to the hollow body.

9. The recyclable container of claim 1, wherein a left end of the flex portion of the first lock tab is spaced apart from a left curved portion of the top end of the second side panel when the left end of the flex portion of the first lock tab is coplanar with the left curved portion of the top end of the second side panel;

a right end of the flex portion of the first lock tab is spaced apart from a right curved portion of the top end of the second side panel when the right end of the flex portion of the first lock tab is coplanar with the right curved portion of the top end of the second side panel;

a left end of the flex portion of the second lock tab is spaced apart from a left curved portion of the bottom end of the second side panel when the left end of the flex portion of the second lock tab is coplanar with the left curved portion of the bottom end of the second side panel; and a right end of the flex portion of the second lock tab is spaced apart from a right curved portion of the bottom end of the second side panel when the right end of the flex portion of the second lock tab is coplanar with the right curved portion of the bottom end of the second side panel.

10. The recyclable container of claim 9, wherein the first lock tab is a first security tab and the second lock tab is a second security tab;

the flex portion of the first lock tab is a lower portion of the first security tab and the flex portion of the second lock tab is a lower portion of the second security tab;

the insertion portion of the first lock tab is an upper portion of the first security tab and the insertion portion of the second lock tab is an upper portion of the second security tab; and the left ear is a left flap of the first security tab and the right ear is a right flap of the second security tab.

11. A method of forming a recyclable container comprising:

providing a side panel;

providing a top panel, the top panel defining an upper load limit of the recyclable container to which the recyclable container can be filled in its assembled state;

providing a bottom panel;

forming an indicator cutout in the side panel, forming a fitted cutout in the side panel, a bottom edge of the fitted cutout offset from the bottom panel, a top edge of the fitted cutout extending from a rounded left side edge of the fitted cutout to a rounded right side edge of the fitted cutout, the top edge being straight and continuous and also offset from the upper load limit of the recyclable container, the bottom edge of the fitted cutout being V-shaped and having a left draft portion and a right draft portion, the left draft portion of the bottom edge of the fitted cutout extending from a rounded left side edge of the fitted cutout to the right draft portion of the bottom edge, and the right draft portion of the bottom edge of the fitted cutout extending from the rounded right side edge of the fitted cutout to the left draft portion of the bottom edge, each of the left draft portion and the right draft portion of the bottom edge being straight and continuous, the fitted cutout being centered horizontally in the side panel, the fitted cutout separated from the indicator cutout, a first distance from the fitted cutout to a top end of the side panel less than a second distance from the indicator cutout to the top end of the side panel;

assembling the recyclable container, the recyclable container forming a square cross-section; and placing the bottom end of the recyclable container on a horizontal surface, an outside surface of the bottom panel touching the horizontal surface, the recyclable container remaining vertical after placement.

12. The method of claim 11, wherein the side panel includes a lock tab and the recyclable container defines a corresponding lock tab slot, the method further comprising the step of inserting the lock tab into the lock tab slot.

* * * * *